United States Patent
Iwashita et al.

(10) Patent No.: US 7,368,887 B2
(45) Date of Patent: May 6, 2008

(54) SERVO CONTROL DEVICE AND METHOD OF ADJUSTING SERVO SYSTEM

(75) Inventors: Yasusuke Iwashita, Fujiyoshida (JP); Takahiro Akiyama, Yamanashi (JP); Masakazu Niwa, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 90 days.

(21) Appl. No.: 11/356,291

(22) Filed: Feb. 17, 2006

(65) Prior Publication Data

US 2006/0186849 A1     Aug. 24, 2006

(30) Foreign Application Priority Data

Feb. 17, 2005   (JP)   ............... 2005-040582

(51) Int. Cl.
    *G05B 11/32*     (2006.01)
(52) U.S. Cl. .................. 318/576; 318/560; 318/689; 318/571; 318/684; 318/664; 701/1; 701/56
(58) Field of Classification Search ............... 318/560, 318/576, 689, 671, 684, 664, 578; 700/1, 700/56
    See application file for complete search history.

(56) References Cited

U.S. PATENT DOCUMENTS

| | | | | |
|---|---|---|---|---|
| 3,699,317 | A * | 10/1972 | Middleditch | ............. 700/187 |
| 4,881,177 | A * | 11/1989 | McClean et al. | ........... 700/258 |
| 5,313,147 | A * | 5/1994 | Yoneda et al. | ............. 318/569 |
| 5,663,886 | A | 9/1997 | Lueck | |
| 5,926,389 | A | 7/1999 | Trounson | |
| 6,741,055 | B2 * | 5/2004 | Kurokawa et al. | ........... 318/560 |
| 2005/0068288 | A1 * | 3/2005 | Jang et al. | ................. 345/100 |
| 2005/0209712 | A1 * | 9/2005 | Sagasaki et al. | ............. 700/28 |

FOREIGN PATENT DOCUMENTS

| | | |
|---|---|---|
| DE | 34 38 007 A1 | 4/1986 |
| JP | 04177408 A | 6/1992 |
| JP | 2002120128 A | 4/2002 |
| WO | 0036367 A | 6/2000 |

OTHER PUBLICATIONS

Knapp W: "Die Pruefung Der Messgeraetegenauigkeit Mit Dem Kreisformtest" Technische Rundschau, Edition Colibri Ag., Wabem, CH, vol. 77, No. 42, Oct. 1985, pp. 12-20.

* cited by examiner

*Primary Examiner*—Rita Leykin
(74) *Attorney, Agent, or Firm*—Lowe, Hauptman, Ham & Berner, LLP

(57) ABSTRACT

A servo control device that displays, by a two-dimensional image, evaluation of control precision of a servo system, includes: an instruction unit that instructs a position instruction having periodicity; a unit that records a track of position data based on a position feedback of a servo system according to the position instruction; and a first drawing unit that draws position data based on the position feedback, data before a quarter cycle or after a quarter cycle of the position data or position data based on the position instruction before a quarter cycle or after a quarter cycle, on a two-dimensional plane including orthogonal two axes, as the axis data of the orthogonal two axes respectively.

18 Claims, 8 Drawing Sheets

SERVO CONTROL DEVICE AND METHOD OF ADJUSTING SERVO SYSTEM

RELATED APPLICATIONS

The present application is based on, and claims priority from, Japanese Application Number 2005-040582, filed Feb. 17, 2005, the disclosure of which is hereby incorporated by reference herein in its entirety.

FIELD OF THE INVENTION

The present invention relates to a numerical control (NC) device. Particularly, the invention relates to an adjusting device that adjusts the control precision of a servo system, and a method of adjusting the servo system.

BACKGROUND OF THE INVENTION

Conventionally, a machine having plural axes, such as an NC machine tool, gives an arc instruction as orthogonal straight lines having two axes, draws position feedback data of the straight lines having two axes on a two-dimensional plane, and adjusts a servo system using a shape of this track as an evaluation reference, as disclosed in Japanese Patent Application Unexamined Publication No. 4-177408 and Japanese Patent Application Unexamined Publication No. 2002-120128.

FIG. 1 graphically expresses an example of a configuration of an NC device. In this example, a servo system is adjusted based on a conventional method using two orthogonal axes.

In FIG. 1, an NC device 1 can control a servo motor 2 that drives the X-axis and a servo motor 3 that drives the Y-axis, thereby freely moving a position of a work table 4, fitted to the front end of each axis, within an X-Y plane.

In the present example, a control unit 11 of the NC device 1 gives an arc instruction to an X-axis driving unit 12 that controls the position of the work table 4 in the X-axis direction, and gives an arc instruction, of which phase is deviated by 90 degrees from the phase of the above arc instruction, to a Y-axis driving unit 13 that controls the position of the work table 4 in the Y-axis direction.

The control unit 11 receives position feedback information from the servo motors 2 and 3 and the work table 4, and converts the position feedback information into normal polar coordinates ($x = \sin\theta, y = \cos\theta, 0 \leq \theta < \pi$), thereby calculating an actual move position of the work table 4. In this case, the work table 4 moves along a unit circle ($x^2 + y^2 = 1$). The control unit 11 displays the actual move position of the work table 4 on a monitor 5 using a personal computer or the like, by superimposing the actual move position with the instruction arc (unit circle) as the evaluation reference value of the servo system adjustment.

FIG. 2 shows one example of a monitor screen shown in FIG. 1. FIG. 2 shows a superimposition of the evaluation reference value according to the instruction arc, and the position feedback information obtained by actually moving the work table 4 based on the instruction arc. It is clear from FIG. 2 that an error of the servo system occurs mainly due to quadrant projections 21 to 24 attributable to nonlinearities (frictions) before and after a speed polarity changes. The quadrant projections 21 to 24 appear as shape errors when an arc instruction is given to the orthogonal two axes (X-Y axes).

An operator adjusts the servo system so that the quadrant projections 21 to 24 become close to zero (i.e., instruction arc), while watching the drawing track displayed on the monitor 5. Based on this, the operator can easily evaluate processing precision of the machine tool without actually carrying out a work process.

At the time of adjusting a servo system of a single control axis such as a straight line axis and a rotation axis having no adjacent orthogonal axes, a shape error also occurs before and after the speed polarity is changed. However, in this case, because adjacent axes, like the orthogonal two axes which can easily draw an arc, are not present, a visual evaluation standard on which the servo axis is adjusted is not present. Therefore, the servo system cannot be visually adjusted easily.

For the above reason, at the time of adjusting a servo system of a single control axis such as a straight line axis and a rotation axis having no adjacent orthogonal axes, a work process is actually carried out to evaluate the processing precision of the machine tool. When this method is used, the work efficiency of adjusting the single control axis such as a straight line axis and a rotation axis having no adjacent orthogonal axes is extremely decreased, and the adjustment cost increases substantially.

SUMMARY OF THE INVENTION

In the light of the above problems, it is an object of the present invention to provide a method of adjusting a servo system capable of visually adjusting the servo system in a similar manner to that using the conventional orthogonal two axes, at the time of adjusting the servo system of a single control axis such as a straight line axis and a rotation axis having no adjacent orthogonal axes.

According to a first aspect of the present invention, there is provided a control device including: an instruction unit that instructs a position instruction having periodicity; a unit that records a track of position data based on a position feedback of a servo system according to the position instruction; and a first drawing unit that draws position data based on the position feedback, data before a quarter cycle or after a quarter cycle of the position data or position data based on the position instruction before a quarter cycle or after a quarter cycle, on a two-dimensional plane including orthogonal two axes, as the axis data of the orthogonal two axes respectively.

According to a second aspect of the invention, there is provided the control device according to the first aspect, further including a second drawing unit that draws, in superimposition on the two-dimensional plane, the position data based on the position instruction and data before a quarter cycle or after a quarter cycle of the position data, as axis data of the orthogonal two axes respectively. According to a third aspect of the invention, the control device further includes an adjusting unit that adjusts the servo system so that a shape drawn by the first drawing unit becomes closer to a shape of an evaluation reference, using a shape drawn by the second drawing unit as the evaluation reference.

According to a fourth aspect of the present invention, there is provided a method of adjusting a servo system including: instructing a position instruction having periodicity; drawing position data based on a position feedback of a servo system according to the position instruction, data before a quarter cycle or after a quarter cycle of the position data or position data based on the position instruction before a quarter cycle or after a quarter cycle, on a two-dimensional plane including orthogonal two axes, as the axis data of the orthogonal two axes respectively; drawing, in superimposition on the two-dimensional plane, the position data based on the position instruction and data before a quarter cycle or after a quarter cycle of the position data, as axis data of the orthogonal two axes respectively; and adjusting the servo system so that a shape drawn based on the position data based on the position feedback and the data before a quarter cycle or after a quarter cycle of the position data or the position data based on the position instruction before a quarter cycle or after a quarter cycle, becomes closer to a shape of an evaluation reference, using a shape drawn based on the position data based on the position instruction and the data before a quarter cycle or after a quarter cycle of the position data as the evaluation reference.

According to the present invention, a sine arc instruction is given to the servo system as a move instruction having periodicity. Position feedback data and data before one quarter cycle or after one quarter cycle or position data based on the position instruction before one quarter cycle or after one quarter cycle are converted into each position data of the X-axis and the Y-axis, and an image obtained is drawn on the two-dimensional plane (X-Y plane). This has the same effect as that of drawing a track of the obtained position feedback data, based on the arc instruction to the orthogonal two axes. Accordingly, it becomes possible to visually adjust the servo system of a single control axis such as a straight line axis and a rotation axis having no adjacent orthogonal axes.

Consequently, in the servo system of a single control axis such as a straight line axis and a rotation axis having no adjacent orthogonal axes, it becomes possible to carry out a high-precision evaluation of the machine tool without actually executing a work process. As a result, efficiency of the adjusting work can be increased, and adjustment cost can be decreased.

BRIEF DESCRIPTION OF THE DRAWINGS

The present invention will be more clearly understood from the description as set forth below with reference to the accompanying drawings, wherein.

DESCRIPTION OF THE PREFERRED EMBODIMENTS

Figure 3:
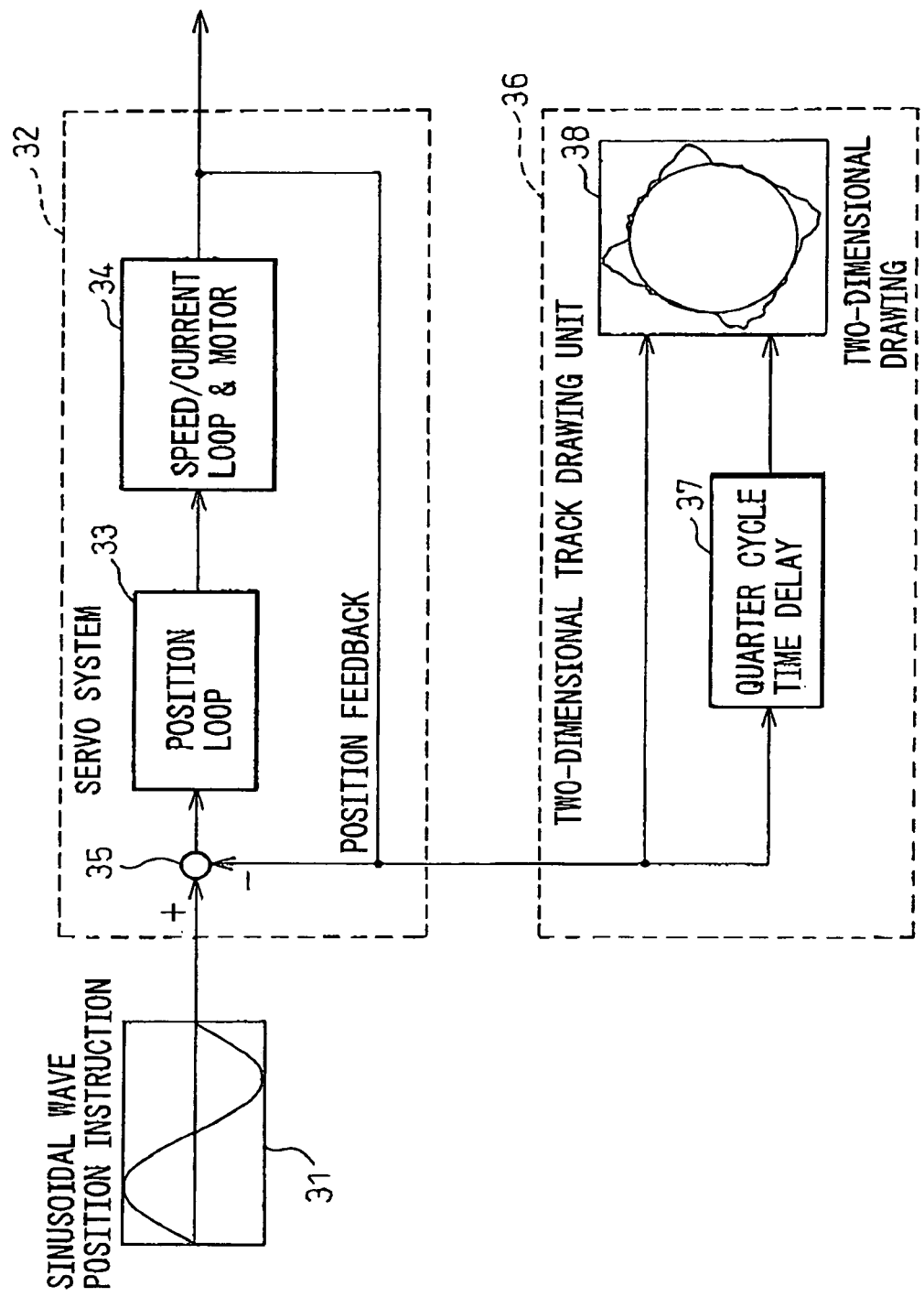
FIG. 3 is an explanatory diagram of one example of a basic configuration of a servo control system according to the present invention.

FIG. 3 is an explanatory diagram of one example of a basic configuration of a servo control system according to the present invention.

In FIG. 3, an arc instruction to adjust a servo system 32 is given to a control axis driving unit 31 of the NC device. With this arrangement, the control axis driving unit 31 outputs an assigned arc position signal to the servo system 32 repetitively in a constant cycle of arcs. A subtracter 35 of the servo system 32 subtracts a position feedback signal sent from a position moving unit 34 that includes a spindle motor, from the position signal sent from the main axis driving unit 31, and outputs a differential signal, which is the difference of these signals, to a position loop processing unit 33 at the next stage.

The position loop processing unit 33 drives the position moving unit 34 at the next stage so that the input differential signal becomes zero. The servo system 32 is controlled so that a move position assigned by the arc instruction coincides with a position actually moved by the position moving unit 34.

On the other hand, a quarter cycle time delay unit 37 outputs a position feedback signal of a delay of one quarter cycle (i.e., phase delay of 90 degrees) of a circle assigned by the arc instruction. When a position feedback signal which is synchronous with the arc instruction is expressed as a function of $\sin \theta$, a position feedback signal of which phase is delayed by 90 degrees is expressed as a function of $\cos \theta$ ($=\sin(\theta-\pi)$).

Figure 1:
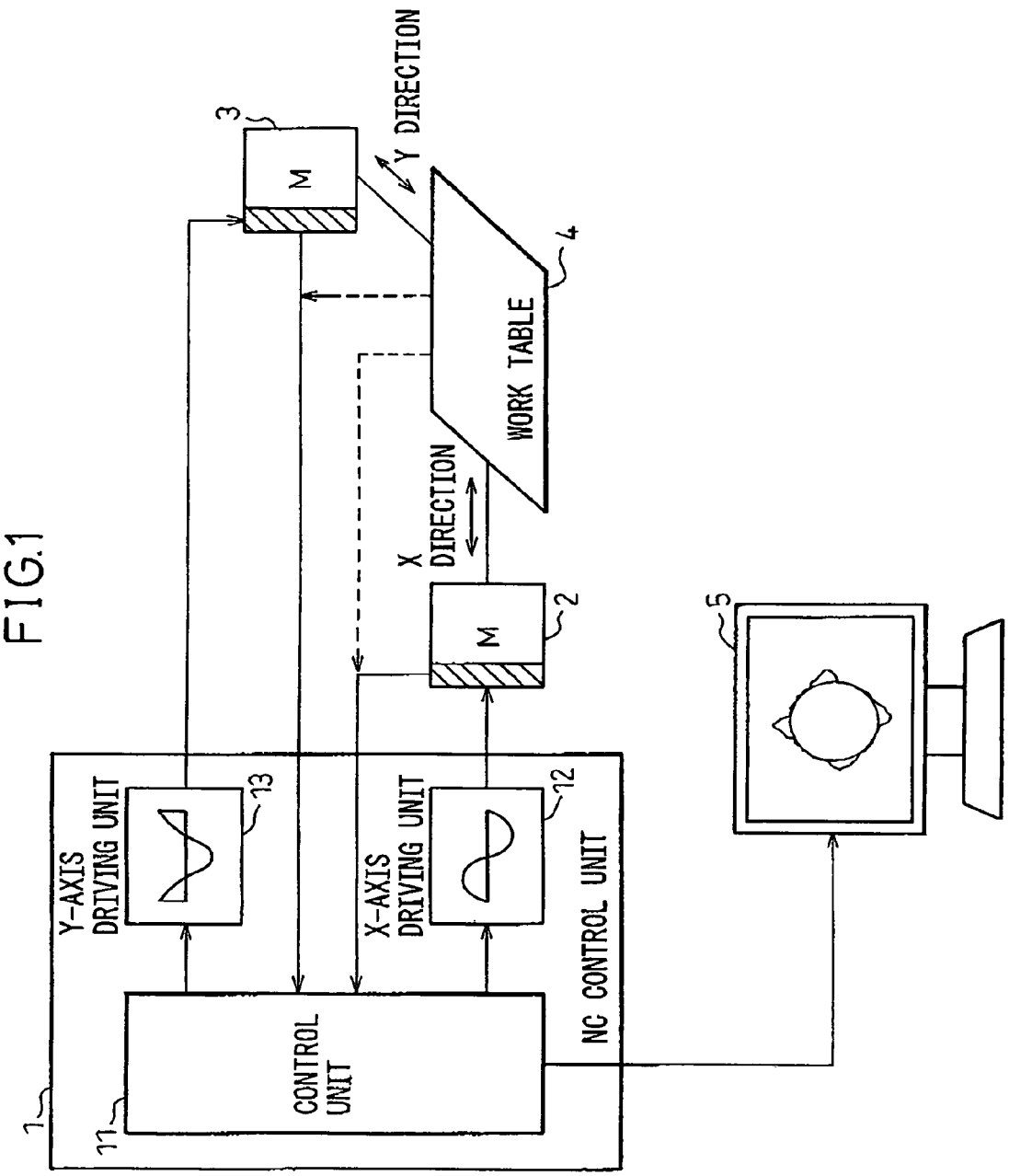
FIG. 1 is an explanatory diagram of one example of a system configuration that can be adjusted using orthogonal two axes.
Figure 2:
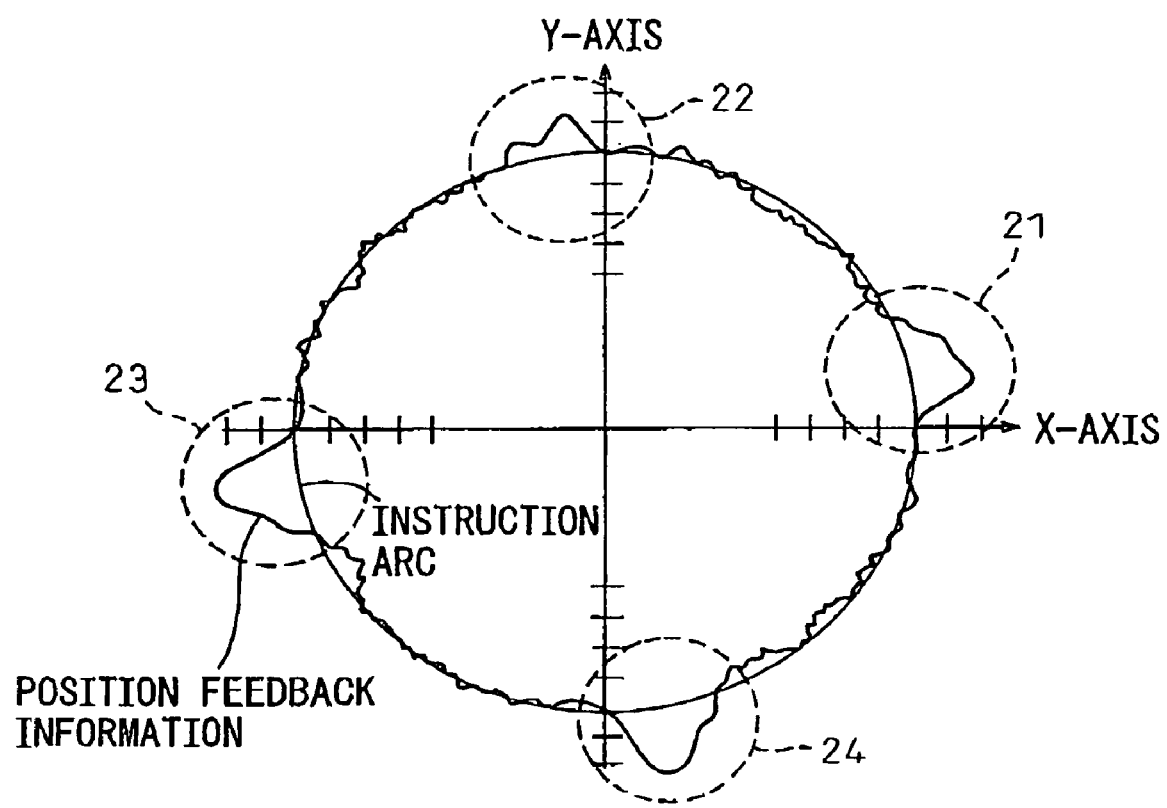
FIG. 2 is an explanatory diagram of a monitoring screen shown in FIG. 1.

When the position feedback signal is x ($=\sin \theta$) and also when the position feedback signal of a phase delay of 90 degrees is y ($=\cos \theta$), the relationship of $x^2+y^2=1$ is obtained as explained in the conventional example in FIG. 2. When this $x^2+y^2=1$ is drawn on the two-dimensional plane (X-Y plane) of the two-dimensional drawing unit 38, a unit circle is obtained. As can be easily analogized from this explanation, drawing both the position feedback data based on the sinusoidal wave instruction and the data of a quarter cycle delay on the two-dimensional coordinates is equivalent to giving an arc instruction to one straight line axis (X-axis) and giving an arc instruction having the same servo characteristic of which phase is delayed by 90 degrees to the axis (Y-axis) orthogonal with the X-axis, and drawing the track of the position feedback data (see FIG. 1).

Figure 4:
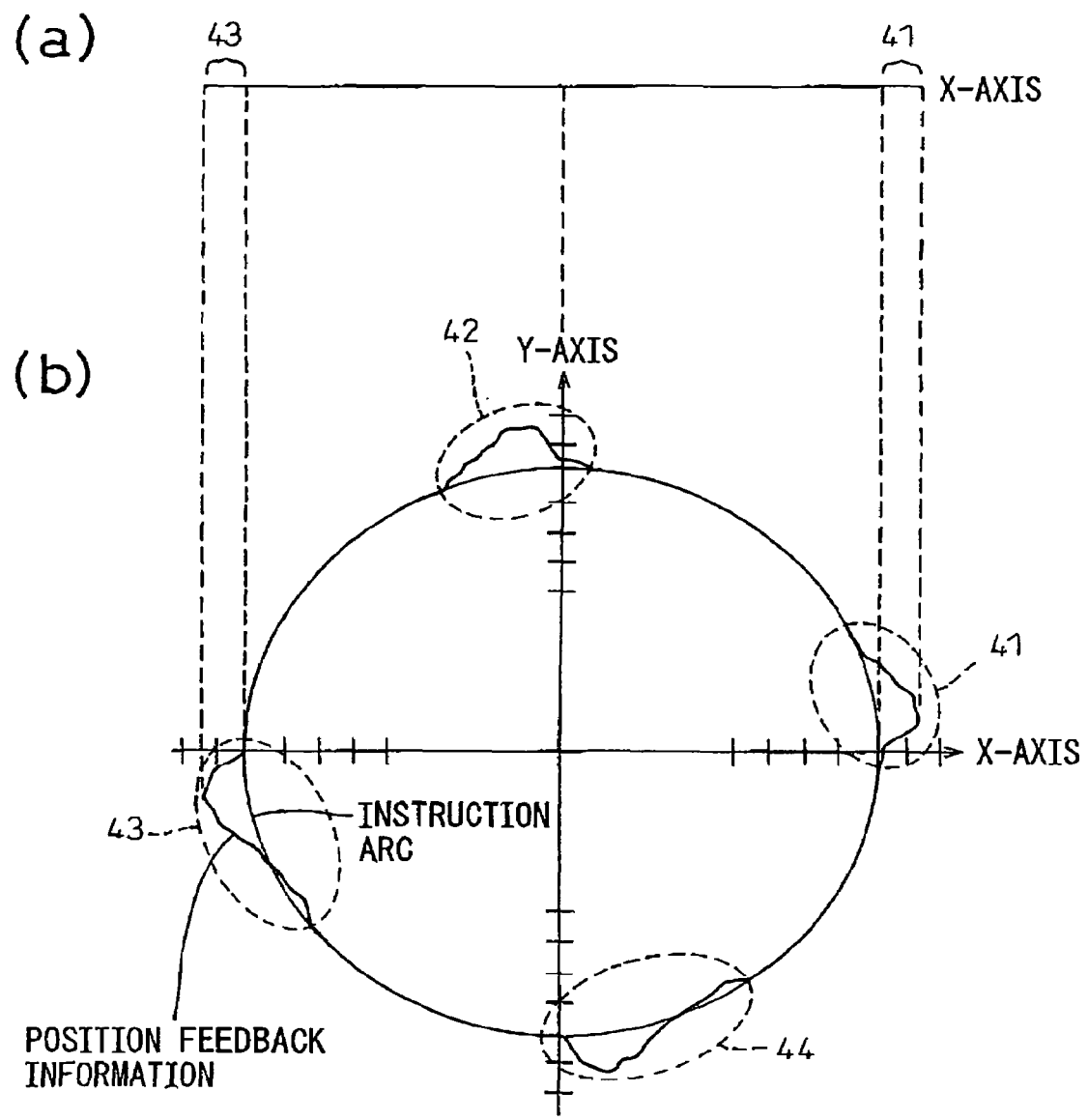
FIG. 4 shows a graph of an example of a display carried out by a two-dimensional drawing unit shown in FIG. 3.

FIG. 4 shows one example of a feedback signal displayed by the two-dimensional drawing unit shown in FIG. 3. A portion (a) of FIG. 4 shows one example of a position feedback signal (x) drawn based on an arc instruction in one straight line axis (X-axis). A portion (b) of FIG. 4 shows one example of a position feedback signal (x, y) drawn on a two-dimensional plane (X-Y plane) by converting the position feedback signal (x) shown in FIG. 4(a) into the two-dimensional drawing.

As is clear from FIG. 4, according to the one-dimensional display in the portion (a) of FIG. 4, it cannot be decided whether the feedback signal (x) moves correctly along the arc based on the arc instruction, and it is not possible to distinguish between the arc and quadrant projections 41 and 43. On the other hand, according to the two-dimensional display in the portion (b) of FIG. 4, it can be easily understood that the feedback signal (x, y) moves along the arc based on the arc instruction, and it is possible to distinguish between the arc and the quadrant projections 41 and 43.

Therefore, in adjusting a servo system of a single control axis such as a straight line axis and a rotation axis having no adjacent orthogonal axes, the servo system can be also adjusted using the same visual method as that conventionally used. According to the present invention, the quadrant projections 41 and 42 have mutually similar shapes, and quadrant projections 43 and 44 have mutually similar shapes.

Figure 5:
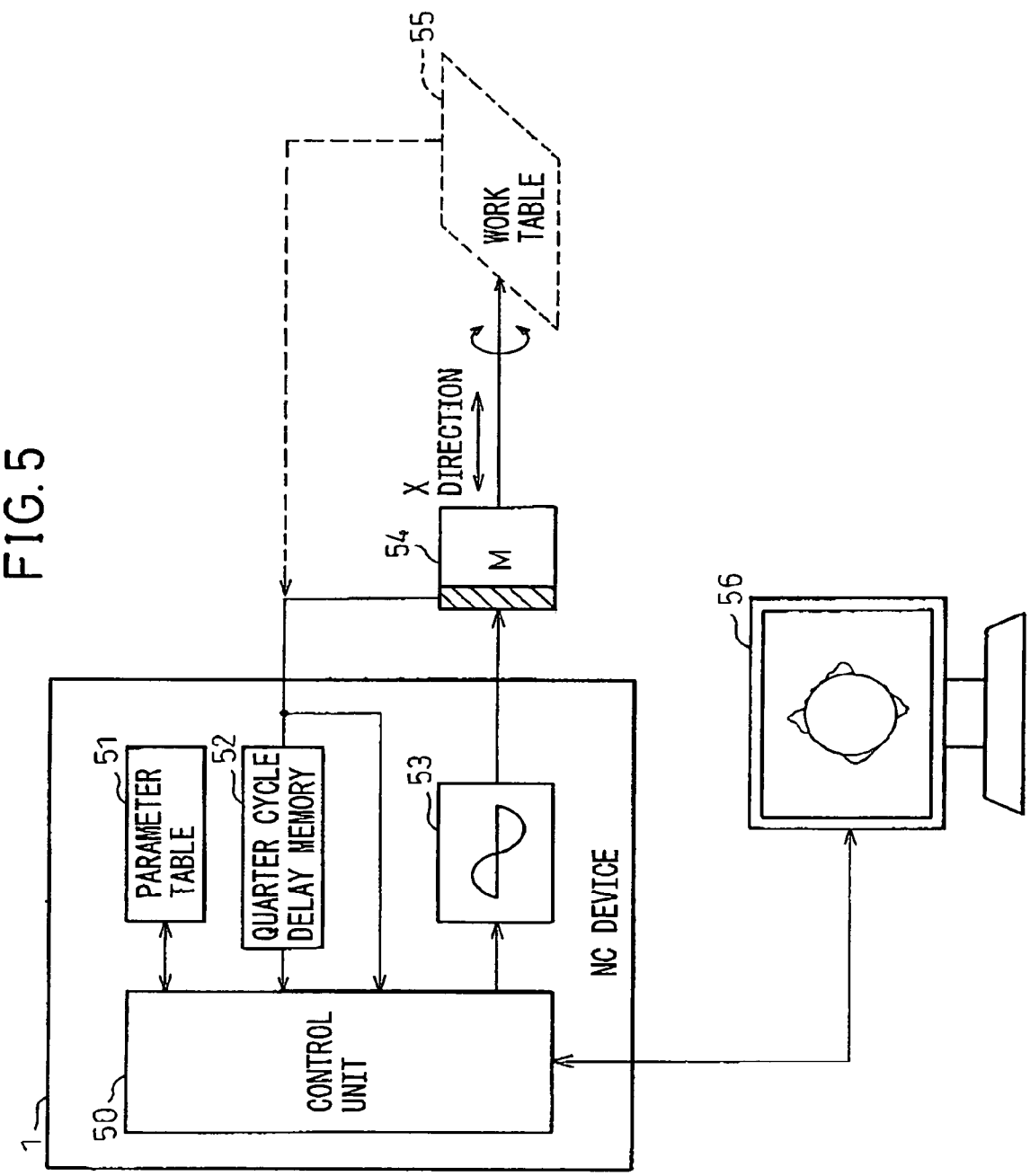
FIG. 5 shows a configuration of a servo control system according to a first embodiment of the present invention.

FIG. 5 shows a configuration of a servo control system according to a first embodiment of the present invention.

In FIG. 5, a control unit 50 is configured by a central processing unit (CPU) circuit. During the operation, the control unit 50 refers to a parameter table 51 disposed on a random access memory (RAM), obtains move speed/current data of a servo motor 54 corresponding to the position data of an arc instruction (x=sin θ) in one direction, and gives the move speed/current data to an X-axis driving unit 53. With this arrangement, the servo motor 54 is driven, and position data, such as a rotation number/angle and a move position that are output from a pulse coder not shown inside the servo motor 54 and a linear scale not shown fitted to a work table 55, is fed back to the control unit 50.

The control unit 50 receives the position feedback data, and compares the position feedback data with the position data that the control unit 50 has given to the X-axis driving unit 53, and obtains the difference between the two data. The control unit 50 negatively feeds back the difference to the X-axis driving unit 53 so that the difference becomes zero. In the present invention, the control unit 50 further converts the received position feedback data into X-axis position data (x=α sin θ, α=1+Δ (θ)).

On the other hand, the position data output from the pulse coder and the linear scale is also input to a quarter delay memory 52 configured by a first-in and first-out (FIFO) memory. The input data is output after a lapse of a quarter cycle (i.e., after a phase delay of 90 degrees) of the arc instruction. In the present invention, the control unit 50 converts the reception data into virtual Y-axis position data (x=β cos θ, β=1+Δ (θ−π/2)). The phase advance of 90 degrees can be also used as the Y-axis position data.

The control unit 50 outputs the received X-axis position data and the received Y-axis position data to a monitor terminal 56 configured by a personal computer via a serial interface of the Recommended Standard 232 version C (RS232C) or a Universal Serial Bus (USB). The monitor terminal 56 displays the X-axis position data and the Y-axis position data on the two-dimensional plane (X-Y plane) as shown in FIG. 4 (b). It can be also arranged such that the X-axis position data and the Y-axis position data are calculated and displayed on the monitor at the monitor terminal 56 side.

The operator rewrites parameters of speeds and currents corresponding to positions in the parameter table 51 so that the levels of the quadrant projections 41 to 44 become equal to or below predetermined permissible values, while watching two-dimensional position data. The monitor terminal 56 instructs the control unit 50 to rewrite these data via the serial interface, and the control unit 50 updates the parameters of the parameter table 51 after receiving the instruction.

Figure 6:
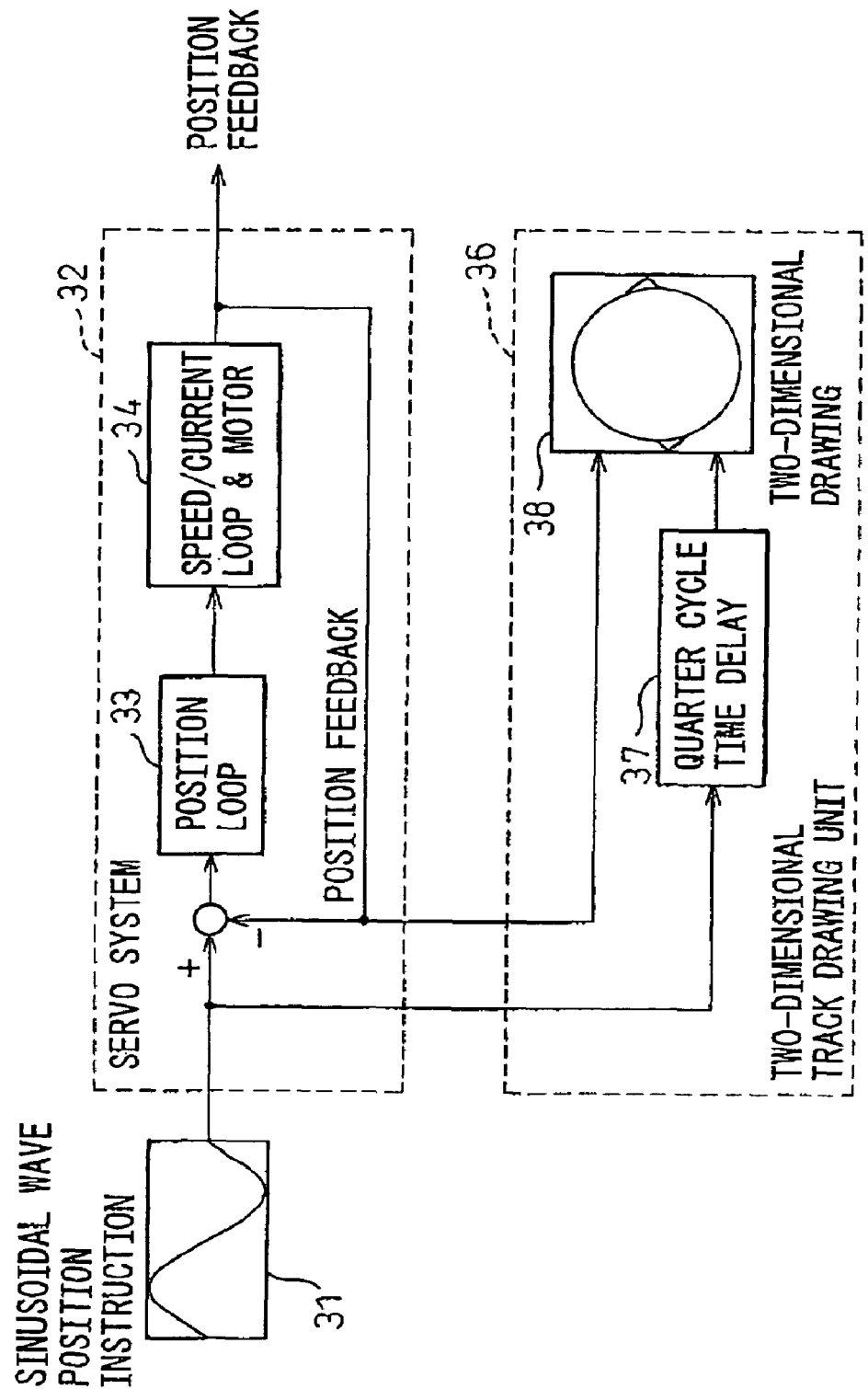
FIG. 6 is a graphical expression of another example of a basic configuration of a servo control system according to the present invention.
Figure 7:
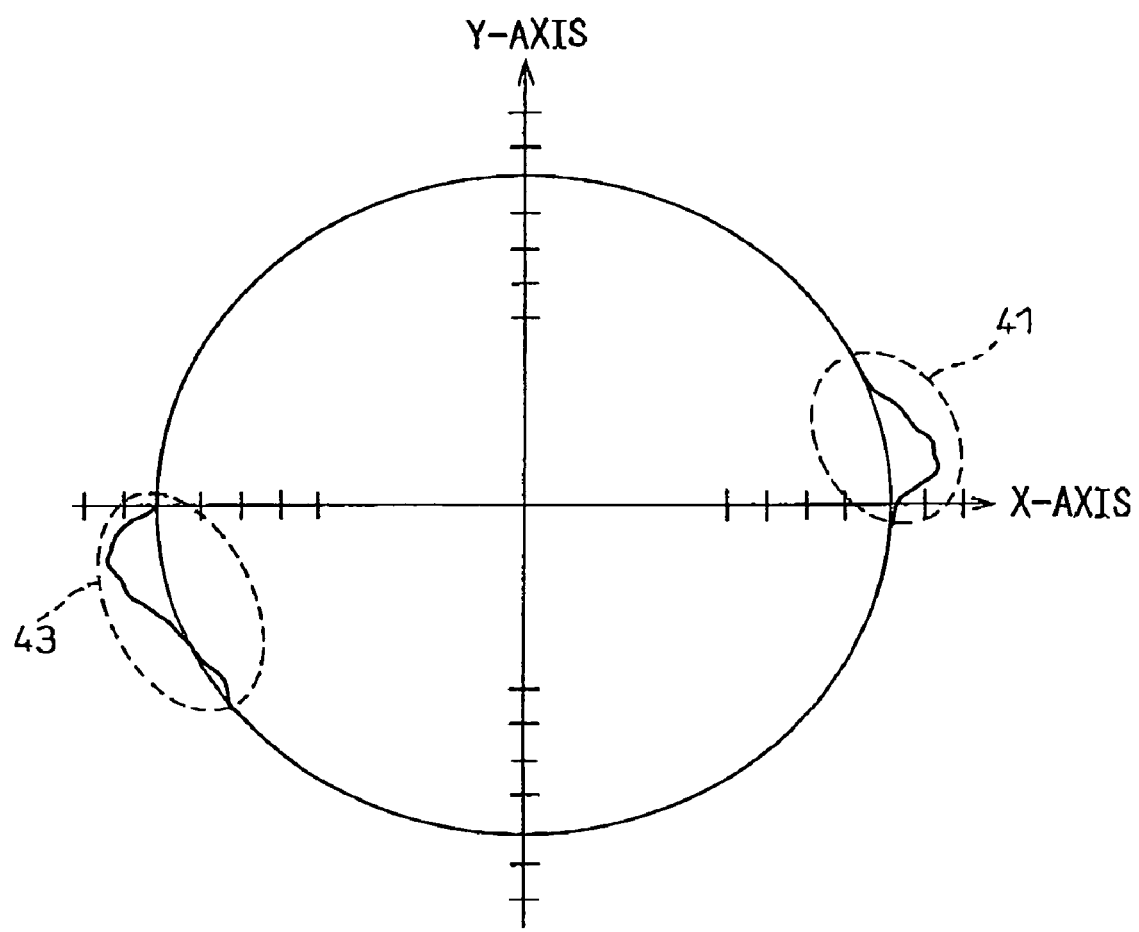
FIG. 7 shows a graph of an example of a display carried out by a two-dimensional drawing unit shown in FIG. 6.

FIG. 6 is a graphical expression of another example of a basic configuration of a servo control system according to the present invention. FIG. 7 shows an example of a feedback signal displayed by the two-dimensional drawing unit 38 shown in FIG. 6.

FIG. 6 is different from FIG. 3 as follows. While the position feedback signal of the servo system is input to the quarter cycle time delay unit 37 in FIG. 3, the arc position signal output from the control axis driving unit 31 is directly input to the quarter cycle time delay unit 37 in FIG. 6. As a result, in the present example, the position data based on the arc instruction in the X-axis direction is directly converted into position data in the Y-axis direction delayed by 90 degrees.

With the above arrangement, in the present example, the quadrant projections 42 and 44 in the Y-axis direction shown in FIG. 3 (i.e., virtual quadrant projections obtained by turning the quadrant projections 41 and 43 of the position feedback signal by 90 degrees) do not occur as shown in FIG. 7. On the other hand, the servo adjustment in one direction (i.e., X-axis direction) and the content of display on the monitor screen coincide with each other. Therefore, the operator can carry out one-axis adjustment based on a visual confirmation that coincides with the actual adjustment work.

Figure 8:
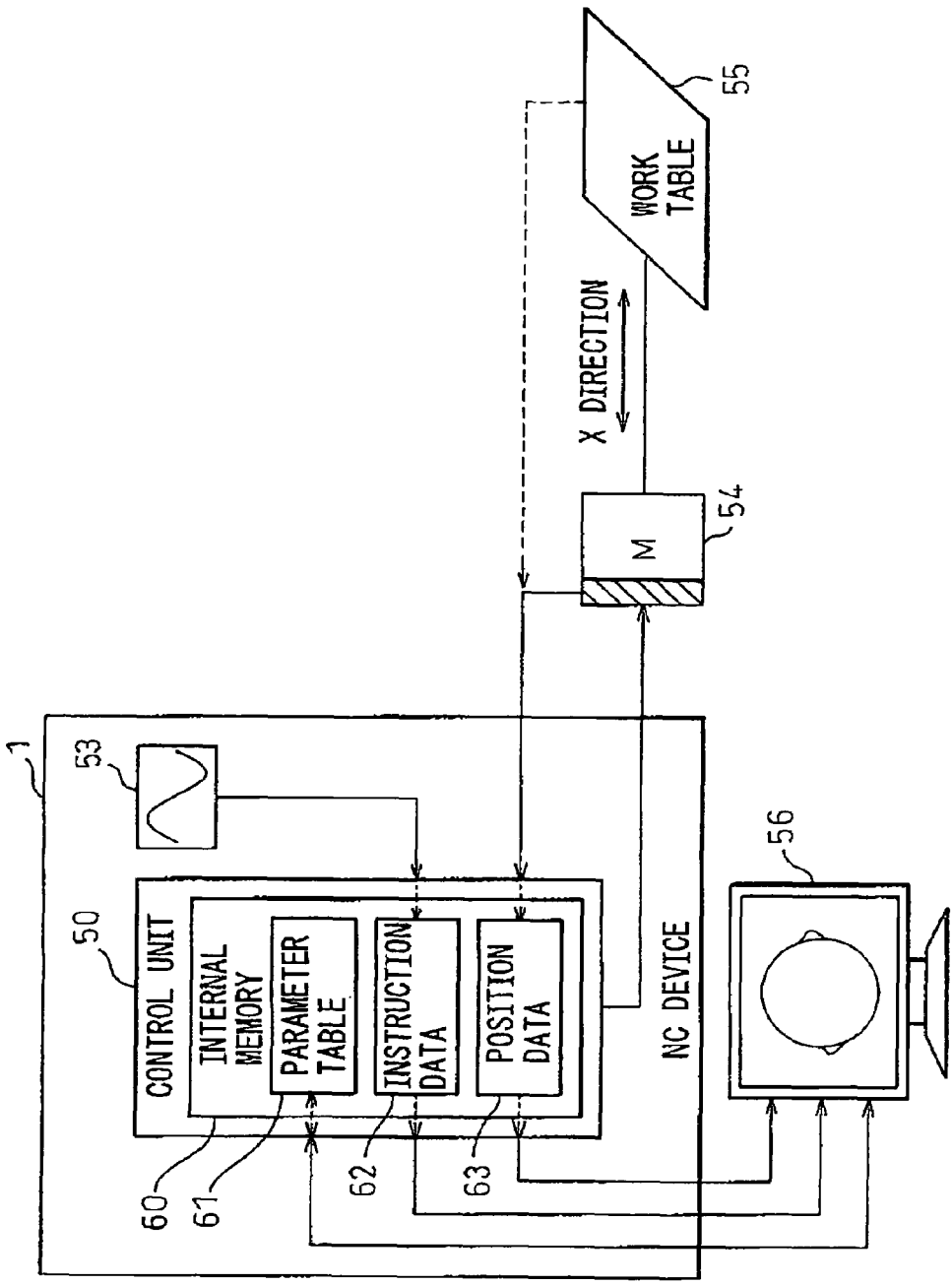
FIG. 8 shows a configuration of a servo control system according to a second embodiment of the present invention.

FIG. 8 shows a configuration of a servo control system according to a second embodiment of the present invention.

According to the present embodiment, a parameter table 61, an instruction data storage area 62, and a position data storage area 63 are provided by using a memory 60 incorporated in the CPU that constitutes the control unit 50 within the NC device. The parameter table 61 corresponds to the parameter table shown in FIG. 5. In the present embodiment, arc instruction data output from the X-axis driving unit 53 are sequentially stored in the instruction data storage area 62. Corresponding position feedback data from the servo system are sequentially stored in the position data storage area 63.

The control unit 50 receives the position feedback data from the position data storage area 63, and converts the position feedback data into X-axis position data (x=α sin θ, α=1+Δ (θ)). The controller 50 obtains arc instruction data of which phase is different by 90 degrees, from the instruction data storage area 62, and converts the arc instruction data into virtual Y-axis position data (y=cos θ). The control unit 50 outputs the position data (x, y) obtained by the conversion, to the monitor terminal 56 configured by the personal computer via the serial interface of the RS232C or the USB. The monitor terminal 56 displays the position data (x, y) as an image on the two-dimensional plane (X-Y plane) as shown in FIG. 7. Alternatively, the X-axis position data and the Y-axis position data can be converted at the monitor terminal 56 side.

The operator rewrites parameters of speeds and currents corresponding to positions in the parameter table 61 so that the levels of the quadrant projections 41 and 43 become equal to or below predetermined permissible values, while watching two-dimensional position data. The monitor terminal 56 instructs the control unit 50 to rewrite these data via the serial interface, and the control unit 50 updates the parameters of the parameter table 61 after receiving the instruction.

As explained above, according to the present invention, feedback track data of a single control axis and a virtual axis orthogonal with the single control axis are drawn on a two-dimensional plane. Based on this, a visual servo adjustment that is conventionally carried out on two orthogonal axes can be also carried out to a single control axis. While the single straight line axis is taken up as an example in the present embodiment, a visual servo adjustment can be also carried out on a control axis which is a rotation axis.

What is claimed is:

1. A control device comprising:
   an instruction unit that instructs a position instruction having periodicity;
   a unit that records a track of position data based on a position feedback of a servo system according to the position instruction; and
   a first drawing unit that draws position data based on the position feedback, data before a quarter cycle or after a quarter cycle of the position data or position data based on the position instruction before a quarter cycle or after a quarter cycle, on a two-dimensional plane including orthogonal two axes, as the axis data of the orthogonal two axes respectively.

2. The control device according to claim 1, further comprising a second drawing unit that draws, in superimposition on the two-dimensional plane, the position data based on the position instruction and data before a quarter cycle or after a quarter cycle of the position data, as axis data of the orthogonal two axes respectively.

3. The control device according to claim 2, further comprising an adjusting unit that adjusts the servo system so that a shape drawn by the first drawing unit becomes closer to a shape of an evaluation reference, using a shape drawn by the second drawing unit as the evaluation reference.

4. The control device according to claim 1, wherein the position instruction includes a sine function or a cosine function.

5. The control device according to claim 1, wherein the servo system has a unit that controls such that the position data based on the position instruction becomes equal to the position data based on the position feedback.

6. A method of adjusting a servo system comprising:
a step of instructing a position instruction having periodicity;
a step of drawing position data based on a position feedback of a servo system according to the position instruction, data before a quarter cycle or after a quarter cycle of the position data or position data based on the position instruction before a quarter cycle or after a quarter cycle, on a two-dimensional plane including two orthogonal axes, as the axis data of the orthogonal two axes respectively;
a step of drawing, in superimposition on the two-dimensional plane, the position data based on the position instruction and data before a quarter cycle or after a quarter cycle of the position data, as axis data of the orthogonal two axes respectively; and
a step of adjusting the servo system so that a shape drawn based on the position data based on the position feedback and the data before a quarter cycle or after a quarter cycle of the position data or the position data based on the position instruction before a quarter cycle or after a quarter cycle, becomes closer to a shape of an evaluation reference, using a shape drawn based on the position data based on the position instruction and the data before a quarter cycle or after a quarter cycle of the position data as the evaluation reference.

7. The method of adjusting a servo system according to claim 6, wherein the position instruction includes a sine function or a cosine function.

8. The method of adjusting a servo system according to claim 6, further comprising a step at which the servo system controls such that the position data based on the position instruction becomes equal to the position data based on the position feedback.

9. A control device, comprising:
an instruction unit for issuing periodic position instruction data to control a one-dimensional movement of a servo system;
a recording unit for receiving a position feedback from the servo system and, based on the position feedback, recording one-dimensional actual position data of the servo system as driven according to the position instruction data; and
a first drawing unit for drawing, on a two-dimensional plane having two orthogonal axes, a plot including
(a) the actual position data on one of the two orthogonal axes; and
(b) 90 degree phase shifted data of either (i) the actual position data or (ii) the position instruction data on the other one of the two orthogonal axes, thereby visually presenting the one-dimensional actual position data on the two-dimensional plane to facilitate visual evaluation of control precision or control adjustment of the servo system.

10. The control device according to claim 9, further comprising a second drawing unit for drawing, in superimposition on the two-dimensional plane, a reference plot including
(a1) the position instruction data on said one of the two orthogonal axes; and
(b1) the 90 degree phase shifted data of the position instruction data on said other one of the two orthogonal axes.

11. The control device according to claim 10, further comprising an adjusting unit for adjusting the servo system so that a shape of the plot drawn by the first drawing unit becomes closer to a shape of the reference plot drawn by the second drawing unit.

12. The control device according to claim 9, wherein the position instruction data includes a sine function or a cosine function.

13. The control device according to claim 9, wherein the servo system has a controlling unit for controlling the position instruction data to be equal to the actual position data based on the position feedback.

14. The control device according to claim 9, wherein said controlling unit includes a subtractor for subtracting the actual position data from the position instruction data.

15. The control device according to claim 9, wherein
the servo system includes a servo motor controllable to move linearly along a straight axis and rotate about a rotational axis, and
the one-dimensional movement to be controlled is a linear movement of said servo motor along the straight axis.

16. The control device according to claim 9, wherein
the servo system includes a servo motor controllable to move linearly along a straight axis and rotate about a rotational axis, and
the one-dimensional movement to be controlled is a rotational movement of said servo motor around the rotational axis.

17. The control device according to claim 9, wherein said plot includes (a) the actual position data on one of the two orthogonal axes; and (b) the 90 degree phase shifted data of the actual position data on the other one of the two orthogonal axes, and has four quadrant projections in vicinity of intersections of said plot and said two orthogonal axes, respectively.

18. The control device according to claim 10, wherein said plot includes (a) the actual position data on one of the two orthogonal axes; and (b) the 90 degree phase shifted data of the position instruction data on the other one of the two orthogonal axes, and has only two projections in vicinity of intersections of said plot and said one of the two orthogonal axes.

* * * * *